(12) United States Patent
Eng

(10) Patent No.: US 7,111,862 B1
(45) Date of Patent: Sep. 26, 2006

(54) UNITIZED FIFTH WHEEL AND REAR AXLE SUSPENSION

(76) Inventor: Allen L. Eng, 713 Knight Bridge Rd., Edmond, OK (US) 73034

( * ) Notice: Subject to any disclaimer, the term of this patent is extended or adjusted under 35 U.S.C. 154(b) by 380 days.

(21) Appl. No.: 10/816,141

(22) Filed: Apr. 1, 2004

(51) Int. Cl.
  *B62D 53/06* (2006.01)
(52) U.S. Cl. .................. 280/438.1; 280/124; 280/128
(58) Field of Classification Search ......... 280/124.115, 280/124.124, 124.128, 124.153, 433, 438.1, 280/439, 440
  See application file for complete search history.

(56) References Cited

U.S. PATENT DOCUMENTS

| | | | |
|---|---|---|---|
| 2,821,409 A | | 1/1958 | Chalmers |
| 3,256,042 A | * | 6/1966 | Hunsaker ................ 298/22 AE |
| 3,380,758 A | | 4/1968 | Granning |
| 3,717,273 A | * | 2/1973 | Berends ................... 280/425.1 |
| 3,797,863 A | * | 3/1974 | Cunha ..................... 280/476.1 |
| 4,029,335 A | | 6/1977 | Cady |
| 4,162,799 A | | 7/1979 | Willetts |
| 4,199,168 A | | 4/1980 | Bush |
| 4,279,430 A | | 7/1981 | Tagg |
| 5,020,820 A | * | 6/1991 | Renner et al. .............. 280/439 |
| 5,090,720 A | * | 2/1992 | Heider et al. ............. 280/438.1 |
| 5,284,356 A | * | 2/1994 | Heider et al. ............. 280/425.1 |
| 5,330,222 A | * | 7/1994 | Halverson et al. ....... 280/438.1 |
| 5,346,247 A | | 9/1994 | Snyder |
| 5,388,849 A | | 2/1995 | Arsenault |
| 5,639,106 A | | 6/1997 | Vitale |
| 6,135,483 A | * | 10/2000 | Metz .......................... 280/439 |
| 6,209,895 B1 | | 4/2001 | Mueller |
| 6,443,476 B1 | * | 9/2002 | Molock, Jr. ................ 280/507 |
| 6,663,131 B1 | * | 12/2003 | Evans ...................... 280/476.1 |
| 2001/0020775 A1 | * | 9/2001 | Pierce et al. .......... 280/124.128 |
| 2003/0132604 A1 | * | 7/2003 | Evans ...................... 280/438.1 |
| 2006/0037787 A1 | * | 2/2006 | Hammonds ................ 180/6.48 |

* cited by examiner

*Primary Examiner*—Paul N. Dickson
*Assistant Examiner*—Barry Gooden, Jr.
(74) *Attorney, Agent, or Firm*—Randal D. Homburg

(57) ABSTRACT

A modular suspension system for short distance repositioning tractors, often referenced as terminal tractors, isolating the shock and impact of a retractable fifth wheel and rear axle from the frame of the terminal tractor by the arrangement of a rear axle and fifth wheel boom having lift cylinders between them and joining the rear axle, a lift arm assembly and a trailing arm assembly as a singular modular unit, isolated from the frame of the terminal tractor by elastomeric bushings at a forward location and pivot point on the terminal tractor frame, with a secondary suspension located at the rear of the singular modular unit.

16 Claims, 9 Drawing Sheets

UNITIZED FIFTH WHEEL AND REAR AXLE SUSPENSION

CROSS REFERENCE TO RELATED APPLICATIONS

None

BACKGROUND OF THE INVENTION

1. Field of Invention

A suspension system for short distance repositioning tractors, often referenced as terminal tractors, isolating the shock and impact of a retractable fifth wheel and rear axle from the frame of the terminal tractor by the arrangement of a rear axle and fifth wheel boom having lift cylinders between them and joining the rear axle, a lift arm assembly and a trailing arm assembly as a singular modular unit, isolated from the frame of the terminal tractor by elastomeric bushings at a forward location and pivot point on the terminal tractor frame, with a secondary suspension located at the rear of the singular modular unit.

2. Description of Prior Art

Typically, a terminal tractor has a short wheelbase of between 110 and 116 inches. It is a cab over engine design with a one person cab, offset far to one side of the chassis. It has a medium duty diesel engine with an automatic transmission and a high reduction rear axle, the automatic transmission and the high reduction rear axle allowing the tractor to start and move a heavy load with a relatively low horsepower engine. The terminal tractor is only intended for short haul purposes in a truck depot or a yard where trailers are to be moved for short distances to and from a loading area. The steering axle is suspended from the frame with semi-elliptical leaf springs, while the rear axle is typically solidly mounted to the frame using mounting brackets and large capscrews to secure the axle. The fifth wheel, used to attach to the trailer, is mounted on a pivoted bracketry, generally referenced as a boom, which raises through hydraulics and lifts a loaded trailer or chassis for a short distance during the transport in the yard or depot.

Current industry standards in suspensions have the rear axle directly mounted to the frame of the tractor. The current standards in boom attachments use steel or bronze bushings rotating on a nominal 2" diameter pivot shaft which floats in round holes in the frame rails, usually called sockets, near the center of the vehicle. Double acting hydraulic cylinders mounted between the frame and the boom provide a 50,000 to 70,000 pound lift capacity at the fifth wheel. Because of the extreme difference in axle weight between the unloaded condition (approximately 4,000 lbs.) of the terminal tractor and the loaded condition (approximately 30,000 lbs.), finding a working suspension that performs under both conditions has been a challenge.

The domestic terminal tractor manufacturers have been trying to develop a dependable working suspension for the rear axle of terminal tractors for several years. In the early 1980s, rubber block suspensions were attempted to cushion the frame from the shocks of ground impacts, but they provided very little flexibility. Since about the middle 1980s, several manufacturers have offered versions of conventional spring suspensions fitted to provide limited flexibility in empty and light load conditions and to settle the frame on rubber bumpers above the axle under heavy load conditions. This system is complex and expensive, but seems to be the best suspension alternative to date. Since 1992, a company named Capacity has offered a rear axle air suspension option, featuring a large A-frame under the chassis, connected to a central frame cross-member approximately below the boom attachment point near the center of the vehicle. The rear axle and lift cylinders attach to the rear ends of the A-frame below the chassis. Air springs between the axle and the frame allow vertical movement of the rear axle relative to the frame, lift the boom from the A-frame, independent of the chassis, which allows effective isolation of the chassis from vertical movement of the rear axle and boom. A bushed single front attachment of the A-frame suggests allowance of side-to-side rotation of the axle relative to the frame. However, solid mounting of the lift cylinders to the fifth wheel boom, solidly pinned to the frame through a steel pivot shaft and bushings prevents side-to-side suspension rotation and creates extreme high stress loads at the A-frame connection, pivot shaft mountings and bushings. The cost, weight and complexity of this suspension are significant and it has proven to be expensive to maintain and service. This type product accounts for only a small percent of the market.

The following United States patents were discovered and are disclosed within this application for utility patent. In U.S. Pat. No. 6,209,895 to Mueller, an axle suspension is provided for a wheeled vehicle having an axle suspension pivotally engaged with the frame with a rubber bushing acting as cushion along with a shock relating between the frame and rear axle mount. In U.S. Pat. No. 6,135,483 to Metz, a fifth wheel suspension system is disclosed wherein the frame has three separate pivotal mounting locations, having a first pivotal mount located between the frame and a rear axle support arm having an attached rear axle, with a bushing for a cushion and a shock, similar to Mueller, supra. This suspension system also contains pivotal mountings between the frame and two fifth wheel lift arms, with a hydraulic cylinder between the rear axle support arm and the base of the fifth wheel. This still relates shocks of the rear axle directly to the fifth wheel and also to the three pivotal connections to the frame.

Several patents use air suspension systems in a variety of pivotal mounting mechanisms for fifth wheels, including U.S. Pat. No. 2,821,409 to Chalmers, U.S. Pat. No. 3,380,758 to Granning, U.S. Pat. No. 5,388,849 to Arsenault, U.S. Pat. No. 4,279,430 to Tagg, and U.S. Pat. No. 5,639,106 to Vitale. Those using rubber bushings for cushion between related pivotal components having fifth wheel application included U.S. Pat. No. 4,162,799 to Willetts, U.S. Pat. No. 5,346,247 to Snyder and U.S. Pat. No. 5,655,788 to Peaker. None of the suspension systems include a singular pivot point between the frame, the rear axle and the fifth wheel boom which singularly isolate the frame from the rear axle and the fifth wheel boom, yet provide a secondary suspension between the frame and the fifth wheel boom under heavy load as well as a no-load situation.

SUMMARY OF THE PRESENT INVENTION

The unitized fifth wheel and rear axle suspension provides a completely new approach to isolating and protecting the chassis from ground impacts and road shocks for terminal tractors and other tractor applications. Recognizing the inherent relationship between the rear axle and a fifth wheel boom on adjustable height fifth wheel vehicles with lift cylinders between them, the unitized suspension joins the rear axle, a boom assembly and a trailing arm suspension assembly as a single modular unit. This unit is isolated from the frame of the terminal tractor by specialized elastomer pivot bushings at the forward location and pivot point. It is also suspended at a secondary location at the rear of the frame by a choice of suspension mechanisms including a single transverse leaf spring, two longitudinal leaf springs, two coiled springs with a track bar or two air springs with a track bar. The transverse leaf spring is the secondary suspension mechanism most discussed in the preferred embodiment.

The primary objective of the unitized suspension is to provide enhanced protection to the terminal tractor chassis from ground impacts and road shocks under both loaded and unloaded conditions. A second objective of the unitized suspension is to provide a single pivot engagement between the frame, the rear axle, lift arm assembly and trailing arm suspension of the unitized suspension, with a secondary suspension between the unitized suspension assembly and the frame. A third objective of the unitized suspension is to isolate the lift mechanism from the chassis frame by placing the lift mechanism between the rear axle and the lift arm assembly without direct attachment to the frame.

DESCRIPTION OF THE DRAWINGS

The following drawings are submitted with this utility patent application.

DESCRIPTION OF THE PREFERRED EMBODIMENT

Figure 1:
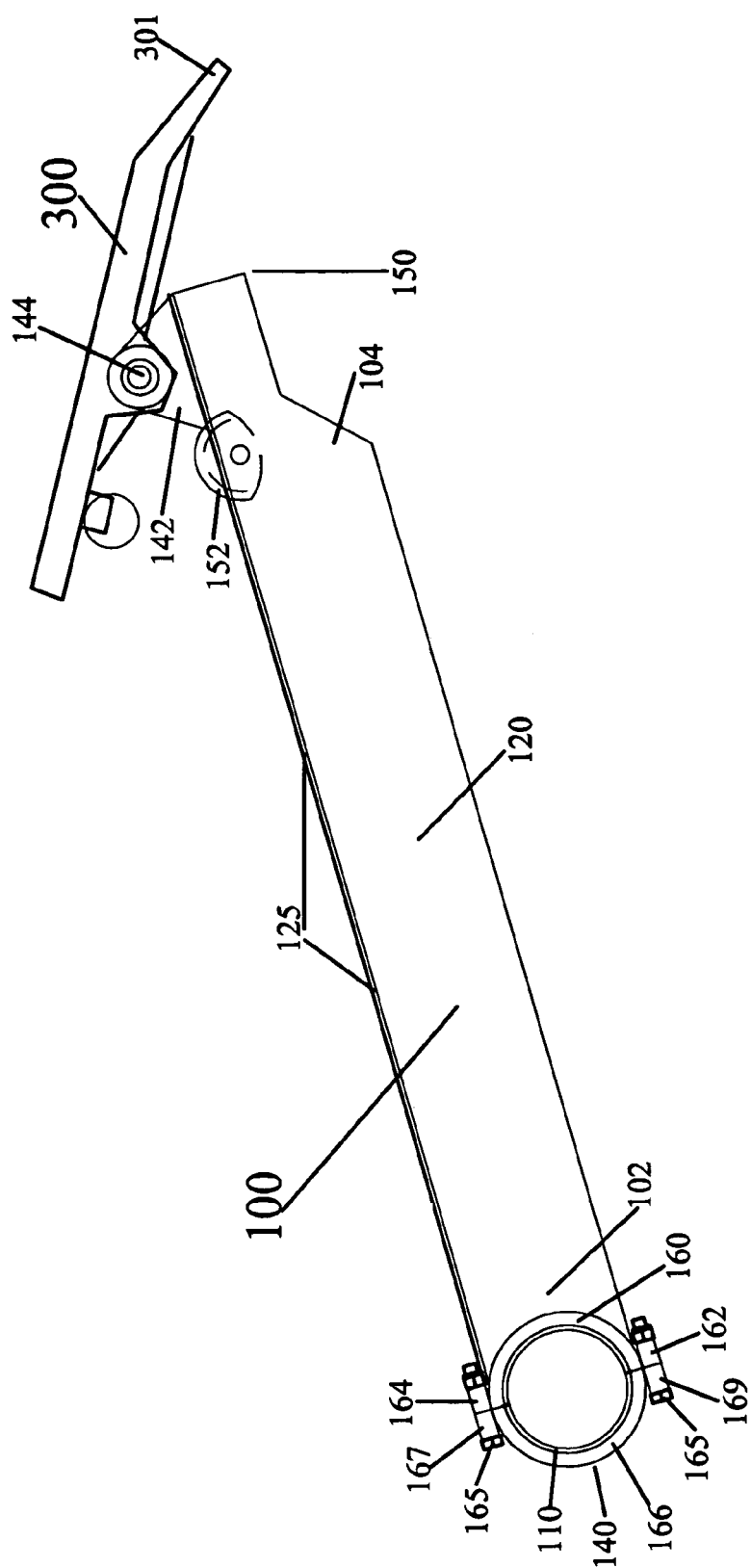
FIG. 1 is a side view of the lift arm assembly and fifth wheel plate.
Figure 2:
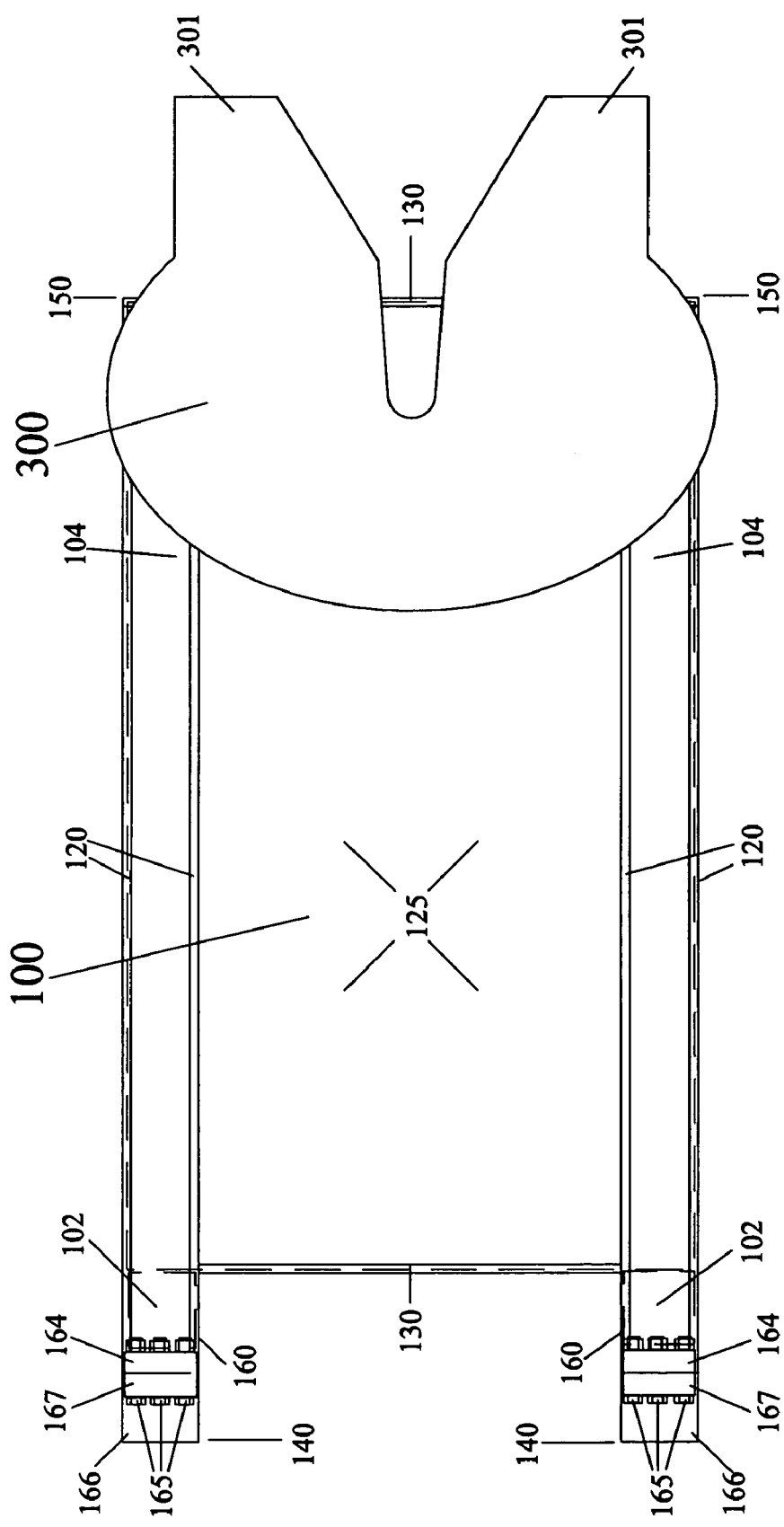
FIG. 2 is a top view of the lift arm assembly and fifth wheel plate.
Figure 3:
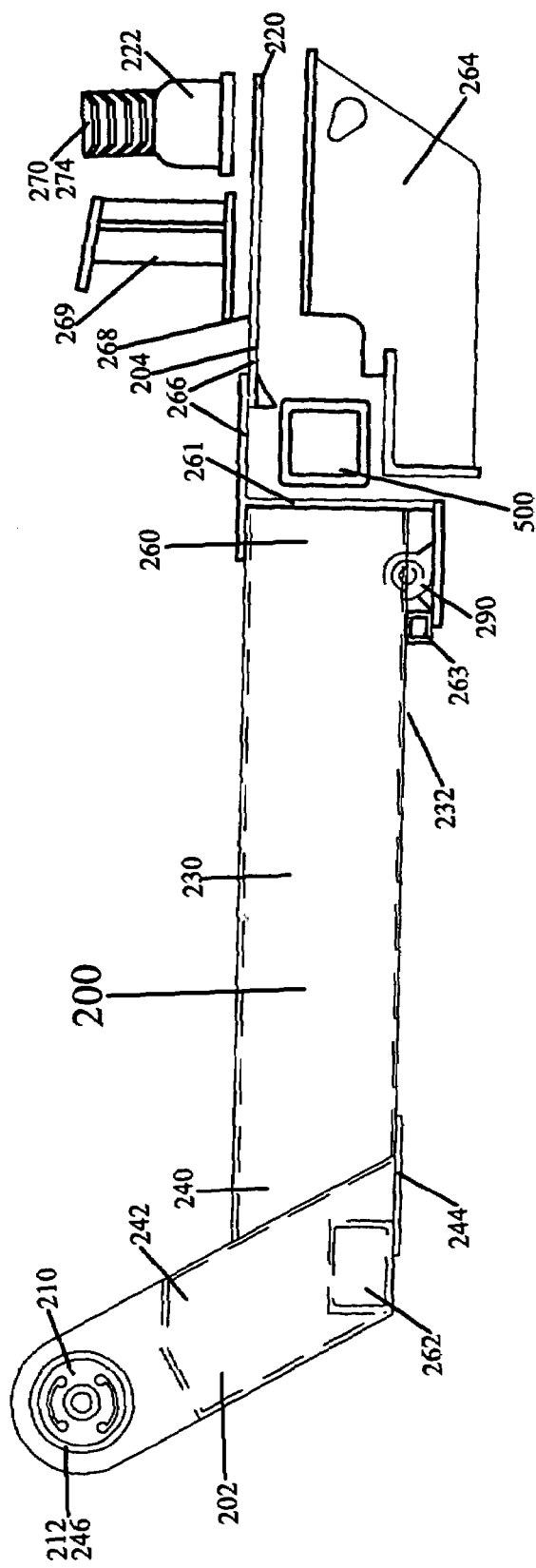
FIG. 3 is a side expanded view of the trailing arm assembly and rear axle.
Figure 4:
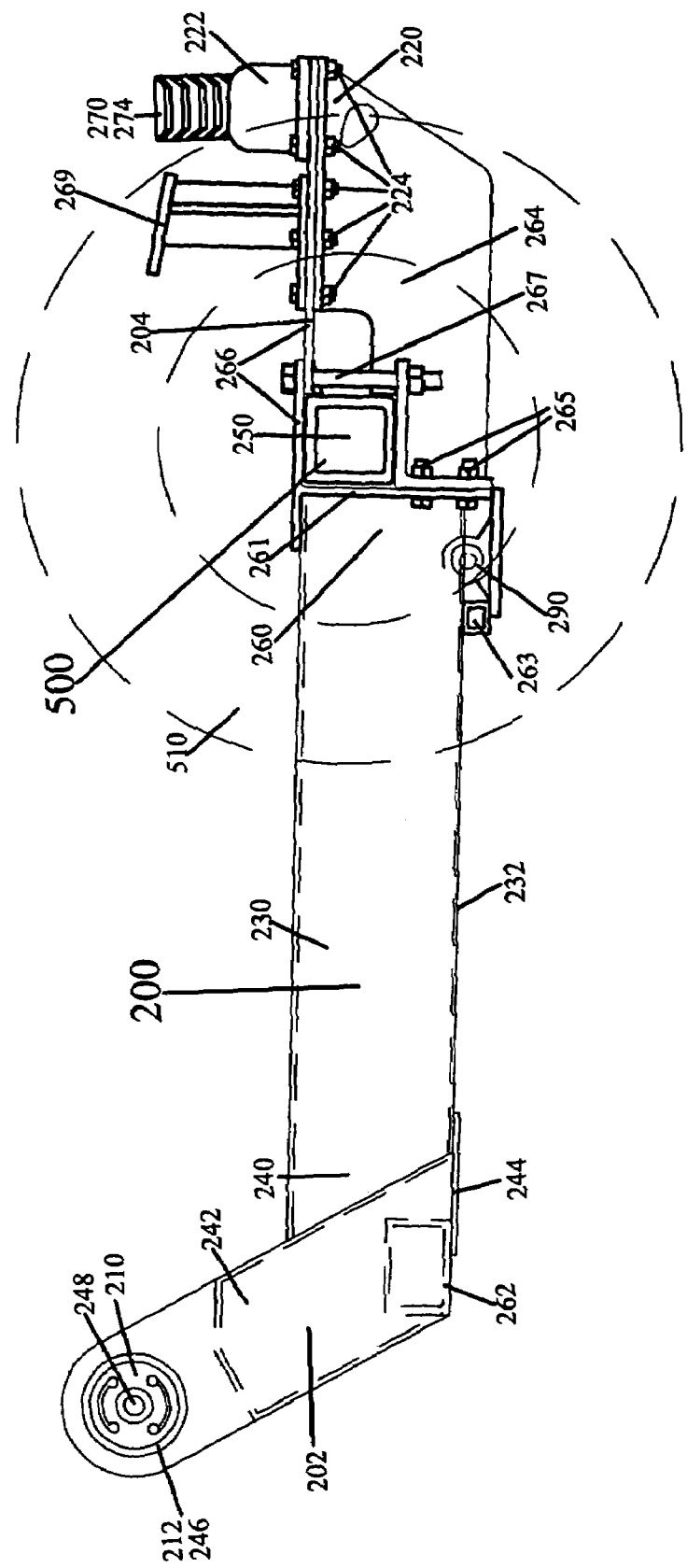
FIG. 4 is a side view of the trailing arm assembly.
Figure 5:
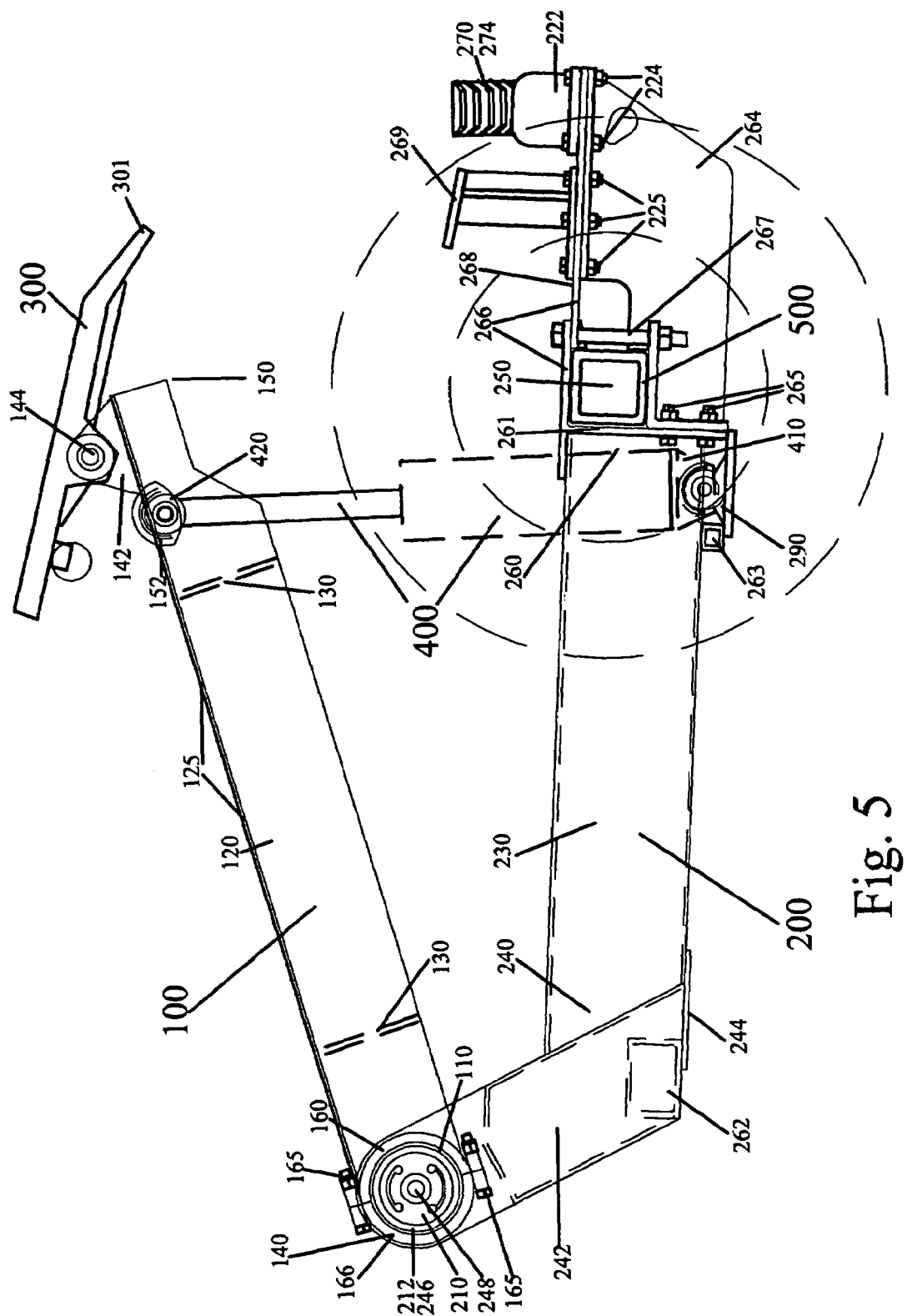
FIG. 5 is a side view of the trailing arm assembly and lift arm assembly connected together as the modular suspension system with the hydraulic lift arm fully raised.
Figure 6:
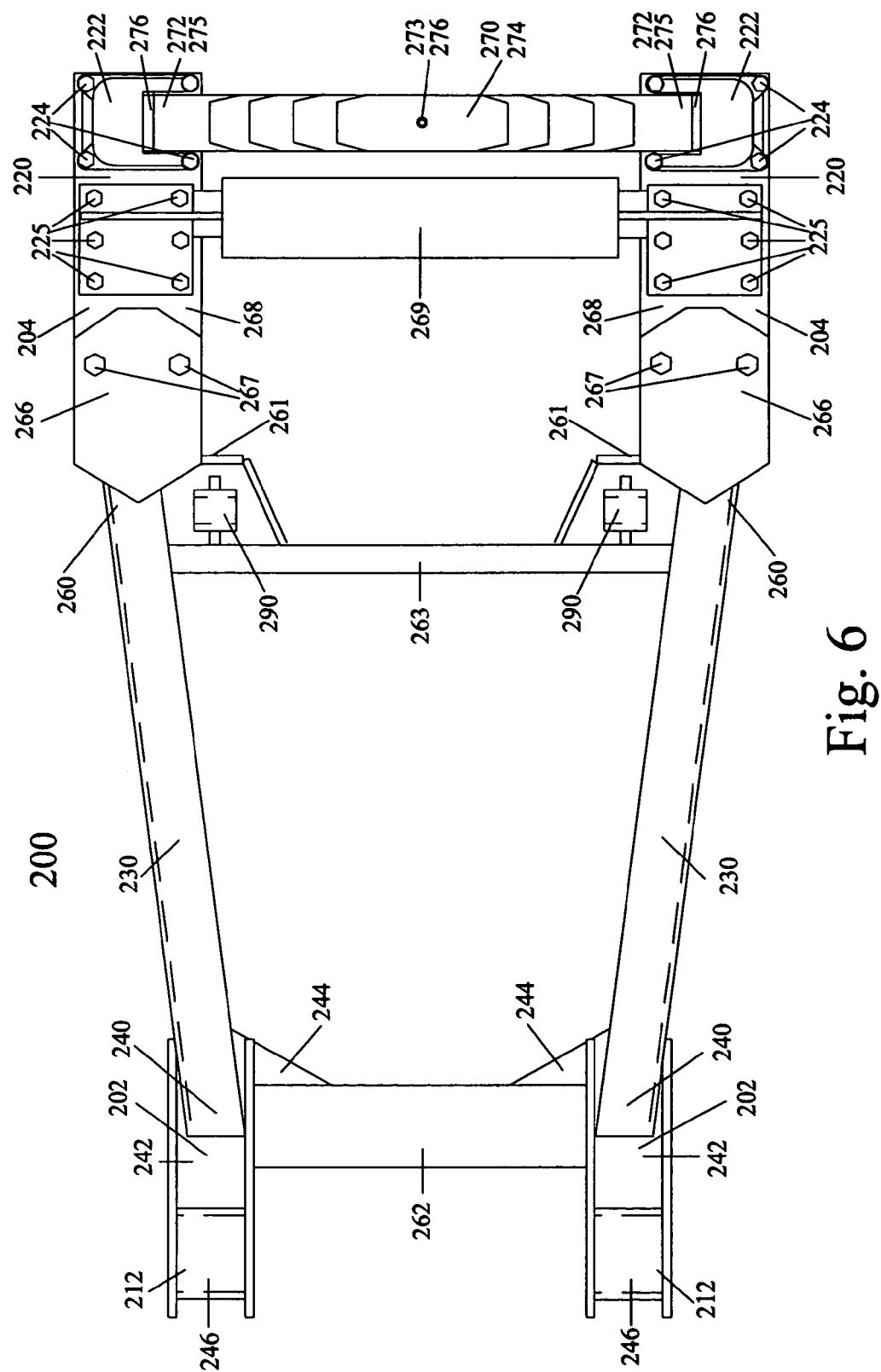
FIG. 6 is a top view of the trailing arm assembly.
Figure 7:
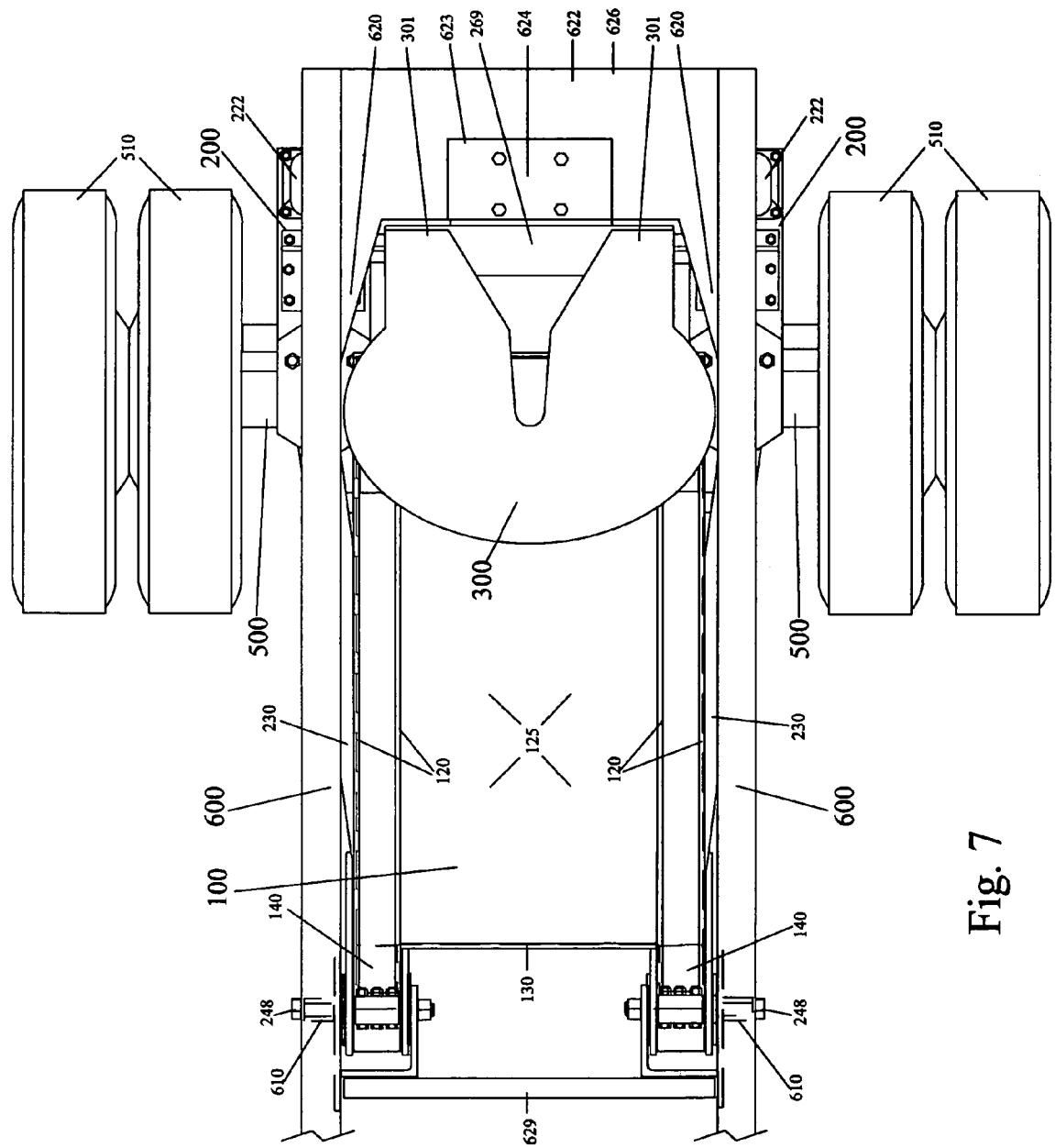
FIG. 7 is a top view of the lift arm assembly and the trailing arm assembly attached to the frame of a terminal tractor.
Figure 8:
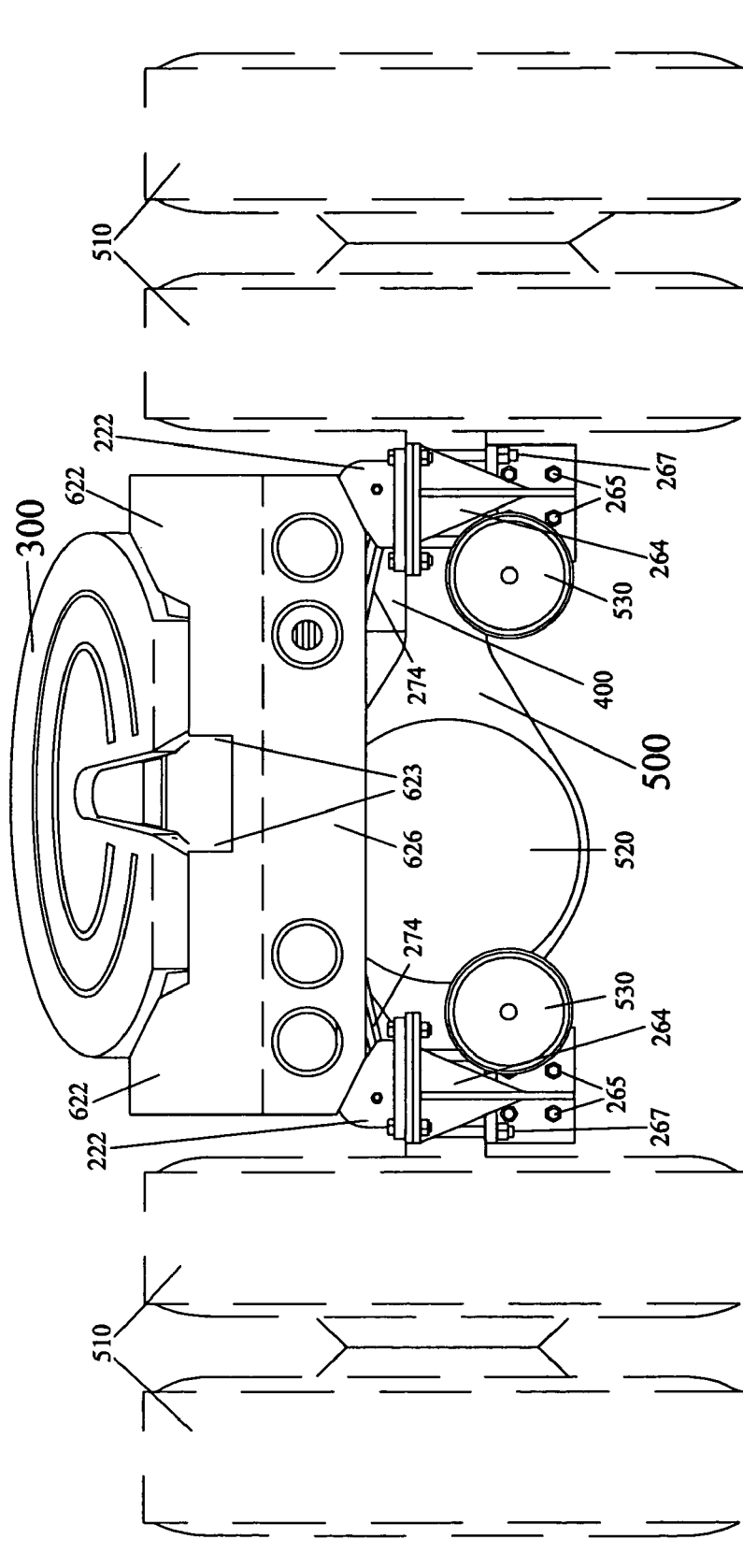
FIG. 8 is a rear view of the lift arm assembly in a lowered position and trailing arm assembly attached to the frame of a terminal tractor with phantom lines showing the tractor tires attached to the rear axle.
Figure 9:
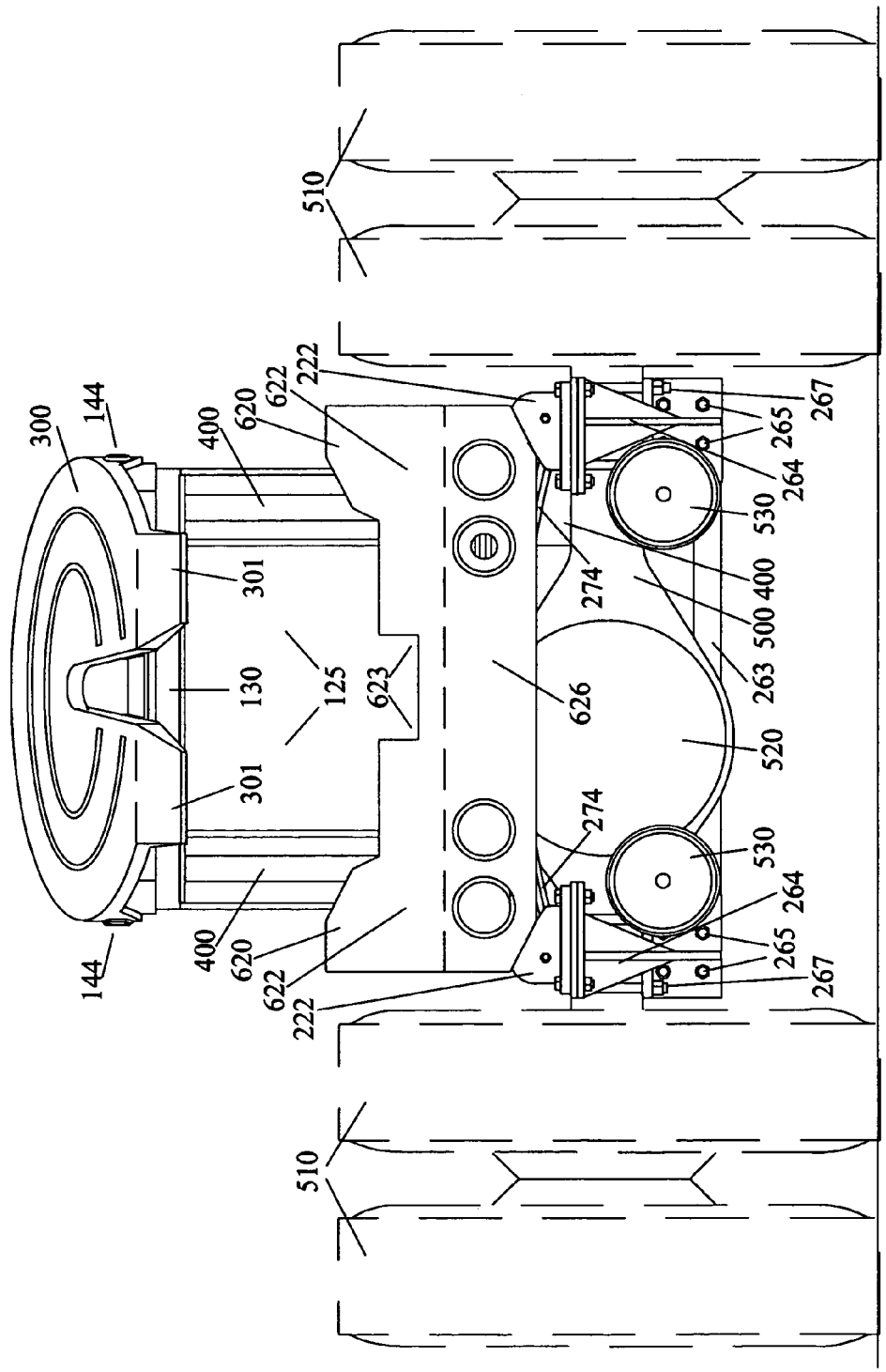
FIG. 9 is a rear view of the lift arm assembly in a fully raised position and trailing arm assembly attached to the frame of a terminal tractor with phantom lines showing the tractor tire attached to the rear axle.

A modular suspension system 10 adapted to a terminal tractor having a frame 600, shown in FIGS. 1–9 of the drawings, comprises a lift arm assembly 100 having a fifth wheel plate 300, a trailing arm assembly 200 attaching to a rear axle 500, the trailing arm assembly 200, having a front segment 202 and a rear segment 204, having the front segment 202 pivotally connecting to the frame 600 of the terminal tractor at two pivot bushing socket tubes 610 housing elastomeric trailing arm pivot bushings 210 which rotate on a common axis, with the elastomeric trailing arm bushings 210 holding an enforced longitudinal position of the trailing arm assembly 200 while allowing limited vertical movement and side-to-side rotation of the trailing arm assembly 200 relative to the frame 600. The lift arm assembly 100, which includes a front segment 102 and a rear segment 204, is joined at the front segment 102 to the trailing arm assembly 200 by two larger diameter composite bushings 110 rotating on the outer surface of the pivot bushing socket 212 of the elastomeric trailing arm pivot bushings 210, the elastomeric trailing arm pivot bushings 210 isolating the trailing arm assembly 200 and the lift arm assembly 100 from the frame 600, with at least one lift cylinder 400 forcing the lift arm assembly 100 from the trailing arm assembly 200 to forcibly elevate and lower the lift arm assembly 100 and the fifth wheel plate 300. The at least one lift cylinder may be a hydraulic cylinder, a pneumatic lift device or mechanical lift device, but is shown in FIGS. 5 and 9 as hydraulic cylinders.

The trailing arm assembly 200, shown in FIGS. 3–6, includes a rear portion 220 which supports bracketry, preferably two end housings 222 behind the rear axle 500 which secure ends 272 of a spring means 270 having a center 273, preferably a transverse leaf spring 274 having two ends 275 and a center 277. The transverse leaf spring 274 stabilizes the side to side location of the rear axle 500 and the lift arm assembly 100 and provides controlled vertical and side to side rotational movement, with the spring means 270 or transverse leaf spring 274 being adjusted to a preferred ride character.

The trailing arm assembly 200 also mounts a lower lift cylinder mount 410 of the at least one lift cylinder 400 at a lift cylinder mounting attachment 290 positioned in front of the rear axle 500. Preferable would be the use of two lift cylinders 400 in tandem, as shown in FIG. 9. The lift cylinder 400 has an upper lift cylinder mount 420 which is pivotally mounted to a lift cylinder mounting attachment 152 in the lift arm assembly 100 in front of the fifth wheel plate 300. The lift cylinder 400, when activated, extends, raising the rear segment 104 of the lift arm assembly 100 and the fifth wheel plate 300, further lifting a trailer or chassis attached to the fifth wheel plate 300, transferring the lifting forces to the lift arm assembly 100 and trailing arm assembly 200 and isolating these forces from the frame 600 of the terminal tractor by the composite bushings 110, the elastomeric trailing arm bushings 210 and the spring means 270.

The lift arm assembly 100, shown in FIGS. 1–2, 5 and 7, further comprises at least two longitudinal rails 120 connected by at least two lateral rails 130, each longitudinal rail 120 having a front end 140 and a rear end 150, the rear end 150 including fifth wheel plate mounting brackets 142 between which is attached the fifth wheel plate 300 by pivot pins 144. The rear end 150 also includes the lift cylinder mounting attachments 152 located in front of the fifth wheel plate mounting brackets 142, attaching to the upper lift cylinder mounts 420 of the at least one lift cylinder 400. The front end 140 includes two pivot bushing housings 160 containing two lower mounting blocks 162 and two upper mounting blocks 164 which respectively attach with endcap retaining bolts 165 to two upper endcap mounting blocks 167 and two lower endcap mounting blocks 169 of two endcaps 166, within which the composite pivot bushings 110 are secured. The lift arm assembly is further stiffened and held in desired relation by secure longitudinal and lateral bracing, in this case a welded top plate 125, which fully encloses the top of the lift arm assembly.

The trailing arm assembly 200, FIGS. 3–4, further comprises two trailing arm beams 230 having a front end 240 and a rear end 260, each front end 240 having a lower control arm droplink 242 welded to the trailing arm beam 230, the two trailing arm beams 230 joined at their front ends 240 by a front suspension cross member 262 and reinforced by a corner brace 244. Each control arm droplink 242 defines a pivot bushing socket tube 246 containing the elastomeric trailing arm bushings 210. A suspension attaching bolt 248 attaches each elastomeric trailing arm bushing 210 and each composite bushing 110 through the pivot bushing socket tube 246 and also by suspension attaching bolts 248 to suspension attaching bolt tubes 610 in the terminal tractor frame 600.

The rear end 260 of each trailing arm beam 230 is welded to an axle clamp mounting plate 261 and a trailing arm weldment 266 comprising the rear portion 220 of the trailing arm assembly 200. An axle clamp weldment 264 is secured to the axle clamp mounting plate 261 by lower clamp bolts 265 and to the rear portion 220 of the trailing arm assembly 200 by end housing retainer bolts 224 and rear cross member retainer bolts 225. The axle clamp mounting plate 261, rear axle clamp weldment 264 and trailing arm weldment 266 define a cavity 250 within which the rear axle 500 is secured to the trailing arm assembly 200 and clamped in place by axle clamp bolts 267, FIGS. 3–4. On an upper surface 268 of each trailing arm weldment 266 is a rear cross member and fifth wheel rest weldment 269 and a spring end housing 222 which secure the preferred transverse leaf spring 274, FIG. 6. Welded to a lower surface 232 of each trailing arm beam 230 is the cylinder mounting attachment 290 supporting the lower lift cylinder mount 410 of the lift cylinders 400 and a suspension center cross member 263 connecting the two trailing arm beams 230 and supporting the lower lift cylinder mounting attachments 290. The end housings 222 within which are secured the ends 275 of the transverse leaf spring 274 attach to the trailing arm weldment 266 by upper clamp bolts 224. The ends 275 of the transverse leaf spring 274 are captured in the end housings 222 by rubber spring end isolators 276.

The rear axle 500, having a pair of dual tractor tires 510 on the ends of the rear axle 500, FIGS. 8–9, further attached to the trailing arm assembly 200, is connected to the drive train of the terminal tractor in the same manner as a common rear axle on any terminal tractor, the rear axle 500 including a rear differential 520 attaching to the drive train and including brakes, with brake actuators 530 connected to the foundation brake components contained in the rear axle 500 typically used in terminal tractor rear axles.

A rear loading ramp 620 of the frame 600 of the terminal tractor is designed to accommodate the modular suspension system 10 by the inclusion of a tapered approach section 622 with a suspension mounting cross member 624 located to facilitate mounting of the spring means 270 or the preferred transverse leaf spring 274. A recess 623 in the tapered approach section 622, FIGS. 8–9, comprising a rear cross member plate 626 leading to the approach section 622, directs a semi trailer king pin into the fifth wheel plate 300 when the lift arm assembly 100 is in a lowered position, with tail portions 301 of the fifth wheel plate 300 resting upon the fifth wheel rest weldment 269, FIGS. 7–9.

Other possible embodiments of the spring means 270 would include longitudinal leaf springs, coil springs with a track bar or air springs with a track bar, but would not be as simply applied as the single transverse leaf spring 274.

When the modular suspension system 10 is applied to the frame 600 of the terminal tractor, five scenarios come into play. First, when the terminal tractor is unloaded and the fifth wheel plate 300 is fully lowered, FIG. 8, the modular suspension system 10 substantially isolates the frame from road shocks, using the elastomeric trailing arm bushings 210 and transverse leaf spring 274 as plural isolators. The tails 301 of the fifth wheel plate 300 rest upon the fifth wheel rest weldment 269 which attaches directly to the trailing arm assembly 200, which is isolated from the frame 600 by the rear spring means 270 or the transverse leaf spring 274, with the center 277 of the transverse leaf spring 274 attached to the spring mounting cross member 624 for lateral and vertical location and to provide vertical cushion. This maintains the fifth wheel plate 300 fully synchronized with the modular suspension system 10 and prevents unnecessary wear on the fifth wheel plate 300, the lift arm assembly 100 and trailing arm assembly 200. All rotational forces generated under acceleration and braking are distributed and minimized by the above isolation.

A second scenario is present when the terminal tractor is being loaded while the fifth wheel plate 300 in a lowered position, FIG. 8, but not shown under load, which commonly occurs when the terminal tractor is being hooked to a trailer. If the trailer has a very low coupler height, the tapered approach section 622 of the rear frame cross member 626 slides under the trailer, forcing the frame 600 slightly downward on the modular suspension system 10, and lifting the trailer until the trailer slides onto the fifth wheel plate 300. The weight of the trailer is passed through the rear frame crossmember 626, the spring mounting crossmember 624, the spring means 270 or the transverse spring 274 to the trailing arm assembly 200 and the rear axle 500. Backing on under the trailer will effect coupling. The lift arm assembly 100 would then be lifted after coupling and prior to movement, leading to the third scenario below.

With the loaded trailer attached and the lift arm assembly 100 fully raised, the weight of the trailer is carried through the fifth wheel plate 300, the lift arm assembly 100, lift cylinders 400, trailing arm assembly 200 and the rear axle 500. As much as 10% of the trailer weight could be carried froward to the elastomeric trailing arm bushings 210 and composite bushings 110 where it would then be carried to the frame 600. In this scenario, nearly 95% of the load is carried by the modular suspension system 10 and not the terminal tractor frame.

Fourth, when the fifth wheel plate 300 is raised and the trailer is loaded during acceleration, the distribution of forces will depend on the torque being delivered to the rear axle 500. For example, a 174 horsepower engine, generally supplied as an industry standard, under full throttle acceleration with a heavy load could generate torque in the range of 36,000 lbs/ft (based upon 458 lbs/ft×2.43:1 torque multiplication×3.58:1 reduction in low gear×9.08:1 rear axle drive ratio.) Adding an additional rotational force of approximately 25% or another 9,000 lbs./ft for the inertia of the loaded trailer at 16" of lift height to the 36,000 lbs/ft yields approximately 45,000 lbs/ft, reduced proportionally by the length of the trailing arm assembly 200, approximately 5 feet, for a gross weight yield of 9000 lbs/ft delivered to the elastomeric trailing arm bushings 210 at the center of the frame 600. Without the modular suspension system 10, the terminal tractor bucks or rises abruptly during acceleration. The modular suspension system 10 transfers the primary accelerating forces to the frame 600 of the terminal tractor at the center pivot bushing socket tube 610, effectively balancing the effects of the accelerative forces between the front and rear suspensions and thus reducing the rise at front of the terminal tractor during acceleration and minimizing the resulting lift to the driver.

Fifth, when the fifth wheel plate 300 is raised and the trailer is loaded during deceleration, braking torque is the main factor in determining applied force. Under good repair and a hard braking application as much a 50,000 lbs/ft plus another 25% for kinetic energy of a loaded trailer, factoring reduction due to the nominal 5 foot length of the trailing arm assembly 200, a braking force of approximately 12,500 lbs/ft is presented at the elastomeric trailing arm bushing 210 at the pivot bushing socket tubes 610. Without the modular suspension system 10, the terminal tractor would experience a hard dive at the front of the terminal tractor. With the modular suspension system 10, the terminal tractor and driver experience a significantly less movement, with the modular suspension system 10 more equally distributing the braking force by applying this force at the pivot bushing socket tubes 610 near the center of the frame 600, thus balancing the application of force between the front and rear axles of the terminal tractor and reducing the dive reaction at the front of the frame 600 and on the operator.

Reducing stress and shock loading to the terminal tractor frame reduces wear to the terminal tractor and all of its components, including the electrical system, engine, drive train and front suspension, thus prolonging the useful life of the terminal tractor and lowering cost and frequency of repairs due to stress and shock loading.

While the invention has been particularly shown and described with reference to a preferred embodiment thereof, it will be understood by those skilled in the art that changes in form and detail may be made therein without departing from the spirit and scope of the invention.

What is claimed is:

1. A modular suspension system adapted to a terminal tractor having a frame, comprises:
    lift arm assembly having a front segment and a rear segment pivotally attached to a fifth wheel plate; and
    a trailing arm assembly having a front segment and a rear segment attaching to a rear axle, said front segment of said trailing arm assembly pivotally connecting to said frame of said terminal tractor at two pivot bushing socket tubes housing elastomeric trailing arm pivot bushings which rotate on a common axis, said elastomeric trailing arm bushings holding an enforced longitudinal position of said trailing arm assembly while allowing limited vertical movement and side-to-side rotation of said trailing arm assembly relative to said frame, wherein said front segment of said lift arm assembly is joined to said trailing arm assembly by two large diameter composite bushings rotating on said outer surfaces of said pivot bushing socket tubes of said elastomeric trailing arm pivot bushings, said elastomeric trailing arm pivot bushings isolating said trailing arm assembly and said lift arm assembly from said frame, with at least one lift cylinder forcing said lift arm assembly from said trailing arm assembly to forcibly elevate and lower said lift arm assembly and said fifth wheel plate.

2. The modular suspension system, as disclosed in claim 1, wherein said trailing arm assembly further comprises:
    a rear portion supporting two end housings behind said rear axle securing two ends of a spring means, said spring means having a center, said spring means further stabilizing side to side location of said rear axle and said lift arm assembly and providing controlled vertical and side to side rotational movement, with said spring means adjusted to a preferred riding characteristic.

3. The modular suspension system, as disclosed in claim 1, wherein said trailing arm assembly further comprises:
    a rear portion supporting two end housings behind said rear axle securing two ends of a transverse leaf spring, said transverse leaf spring having a center, said transverse leaf spring further stabilizing side to side location of said rear axle and said lift arm assembly and providing controlled vertical and side to side rotational movement, with said transverse leaf spring adjusted to a preferred riding characteristic.

4. The modular suspension system, as disclosed in claim 1, wherein said trailing arm assembly further comprises:
    a lower lift cylinder mount of said at least one lift cylinder at a lift cylinder mounting attachment positioned in front of said rear axle, said lift cylinder having an upper lift cylinder mount which is pivotally mounted to a lift cylinder mounting attachment in said lift arm assembly in front of said fifth wheel plate, said lift cylinder, when activated, extending and raising said rear segment of said lift arm assembly and said fifth wheel plate, transferring relative lifting forces to said lift arm assembly and trailing arm assembly, isolating said relative lifting forces from said frame of said terminal tractor by said composite bushings, said elastomeric trailing arm bushings and a spring means at said rear segment of said trailing arm assembly.

5. The modular suspension system, as disclosed in claim 1, wherein said trailing arm assembly further comprises:
    two lower lift cylinder mounts of two lift cylinders at two lift cylinder mounting attachments positioned in front of said rear axle, each said lift cylinder having an upper lift cylinder mount which is pivotally mounted to a lift cylinder mounting attachment in said lift arm assembly in front of said fifth wheel plate, said lift cylinders, when activated, extending and raising said rear segment of said lift arm assembly and said fifth wheel plate, transferring relative lifting forces to said lift arm assembly and trailing arm assembly, isolating said relative lifting forces from said frame of said terminal tractor by said composite bushings, said elastomeric trailing arm bushings and a spring means at said rear segment of said trailing arm assembly.

6. The modular suspension system, as disclosed in claim 1, wherein said lift arm assembly further comprises:
    at least two longitudinal rails connected by at least two lateral rails, each longitudinal rail having a front end and a rear end, said rear ends each including a fifth wheel plate mounting bracket between which is attached said fifth wheel plate by pivot pins, each said rear end also including a lift cylinder mounting attachment located in front of said fifth wheel plate mounting bracket, attaching to an upper lift cylinder mount of at least one lift cylinder, each said front end further including a pivot bushing housing containing a lower mounting block and an upper mounting block which respectively attach together with endcap retaining bolts to an upper endcap mounting block and a lower endcap mounting block of an endcap, within which one of said composite pivot bushings are secured, said lift arm assembly further stiffened and held in desired relation by a welded top plate.

7. The modular suspension system, as disclosed in claim 1, wherein said trailing arm assembly further comprises:
    two trailing arm beams having a front end and a rear end, each said front end having a lower control arm droplink welded to each said trailing arm beam, said trailing arm beams joined at said front ends by a front suspension cross member and reinforced by corner braces, each said control arm droplink defining a pivot bushing socket tube containing said elastomeric trailing arm bushings, with a suspension attaching bolt attaching each elastomeric trailing arm bushing and each composite bushing through said pivot bushing socket tube to a suspension attaching bolt tube of said terminal tractor frame, and each said rear end of said trailing arm beam welded to an axle clamp mounting plate and a trailing arm weldment comprising a rear portion of each trailing arm;

an axle clamp weldment secured to an axle clamp mounting plate by lower clamp bolts, said axle clamp weldment further attached to said rear portion of said trailing arm assembly by end housing retainer bolts and rear cross member retainer bolts, wherein said axle clamp mounting plate, rear axle clamp weldment and said trailing arm weldment define a cavity within which said rear axle is secured to said trailing arm assembly and clamped in place by axle clamp bolts;

a rear cross member and fifth wheel rest weldment secured upon an upper surface of each trailing arm weldment with spring end housings securing a spring means;

a cylinder mounting attachment welded to a lower surface of each trailing arm beam supporting a lower lift cylinder mount of at least one lift cylinder and a suspension center cross member connecting said two trailing arm beams and supporting said lower lift cylinder mounting attachments; and two end housings within which are secured ends of said spring means attached to said trailing arm weldment by upper clamp bolts said ends of said spring means secured within said end housings by rubber spring end isolators.

8. The modular suspension system, as disclosed in claim 1, further comprising:

a rear loading ramp integrated within said terminal tractor frame adapted to said modular suspension system, said rear loading ramp defining a tapered approach section having a suspension mounting cross member to facilitate mounting of a spring means, a recess within said tapered approach section defining a rear cross member plate, directed to said fifth wheel plate when said lift arm assembly is in a lowered position.

9. A modular suspension system adapted to a terminal tractor having a frame, comprises:

a lift arm assembly having a front segment and a rear segment pivotally attached to a fifth wheel plate;

a trailing arm assembly having a front segment and a rear segment attaching to a rear axle, said front segment of said trailing arm assembly pivotally connecting to said frame of said terminal tractor at two pivot bushing socket tubes housing elastomeric trailing arm pivot bushings which rotate on a common axis, said elastomeric trailing arm bushings holding an enforced longitudinal position of said trailing arm assembly while allowing limited vertical movement and side-to-side rotation of said trailing arm assembly relative to said frame, wherein said front segment of said lift arm assembly is joined to said trailing arm assembly by two large diameter composite bushings rotating on said outer surfaces of said pivot bushing socket tubes of said elastomeric trailing arm pivot bushings, said elastomeric trailing arm pivot bushings isolating said trailing arm assembly and said lift arm assembly from said frame, with at least one lift cylinder forcing said lift arm assembly from said trailing arm assembly to forcibly elevate and lower said lift arm assembly and said fifth wheel plate;

said trailing arm portion further comprising a rear portion supporting two end housings behind said rear axle securing two ends of a spring means, said spring means having a center, said spring means further stabilizing side to side location of said rear axle and said lift arm assembly and providing controlled vertical and side to side rotational movement, with said spring means adjusted to a preferred riding characteristic; and a lower lift cylinder mount of said at least one lift cylinder at a lift cylinder mounting attachment positioned in front of said rear axle, said at least one lift cylinder having an upper lift cylinder mount which is pivotally mounted to a lift cylinder mounting attachment in said lift arm assembly in front of said fifth wheel plate, said lift cylinder, when activated, extending and raising said rear segment of said lift arm assembly and said fifth wheel plate, transferring relative lifting forces to said lift arm assembly and trailing arm assembly, isolating said relative lifting forces from said frame of said terminal tractor by said composite bushings, said elastomeric trailing arm bushings and said spring means at said rear segment of said trailing arm assembly.

10. The modular suspension system, as disclosed in claim 9, wherein said lift arm assembly further comprises:

at least two longitudinal rails connected by at least two lateral rails, each longitudinal rail having a front end and a rear end, said rear ends each including a fifth wheel plate mounting bracket between which is attached said fifth wheel plate by pivot pins, each said rear end also including said lift cylinder mounting attachment located in front of said fifth wheel plate mounting bracket, attaching to said upper lift cylinder mount of said at least one lift cylinder, each said front end further including a pivot bushing housing containing a lower mounting block and an upper mounting block which respectively attach together with endcap retaining bolts to an upper endcap mounting block and a lower endcap mounting block of an endcap, within which one of said composite pivot bushings are secured, said lift arm assembly further stiffened and held in desired relation by a welded top plate.

11. The modular suspension system, as disclosed in claim 9, wherein:

said lift arm assembly further comprises at least two longitudinal rails connected by at least two lateral rails, each longitudinal rail having a front end and a rear end, each said rear end including a fifth wheel plate mounting brackets between which is attached said fifth wheel plate by pivot pins, each said rear end also including said lift cylinder mounting attachment located in front of said fifth wheel plate mounting bracket, attaching to said upper lift cylinder mount of said at least one lift cylinder, each said front end further including a pivot bushing housing containing a lower mounting block and an upper mounting block which respectively attach together with endcap retaining bolts to an upper endcap mounting block and a lower endcap mounting block of an endcap, within which one of said composite pivot bushings are secured, said lift arm assembly further stiffened and held in desired relation by a welded top plate; and said trailing arm assembly further comprises two trailing arm beams having a front end and a rear end, each said front end having a lower control arm droplink welded to each said trailing arm beam, said trailing arm beams joined at said front ends by a front suspension cross member and reinforced by corner braces, each said control arm droplink defining a pivot bushing socket tube containing said elastomeric trailing arm bushings, with a suspension attaching bolt attaching each elastomeric trailing arm bushing and each composite bushing through said pivot bushing socket tube to suspension attaching bolt tubes of said terminal tractor frame, and each said rear end of said trailing arm beam welded to an axle clamp mounting plate and a trailing arm weldment comprising a rear portion of each trailing arm;

an axle clamp weldment secured to an axle clamp mounting plate by lower clamp bolts, said axle clamp weldment further attached to said rear portion of said trailing arm assembly by end housing retainer bolts and rear cross member retainer bolts, wherein said axle clamp mounting plate, rear axle clamp weldment and said trailing arm weldment define a cavity within which said rear axle is secured to said trailing arm assembly and clamped in place by axle clamp bolts;

a rear cross member and fifth wheel rest weldment secured upon an upper surface of each trailing arm weldment with said spring end housings securing said spring means;

a cylinder mounting attachment welded to a lower surface of each trailing arm beam supporting said lower lift cylinder mount of said at least one lift cylinder and a suspension center cross member connecting said two trailing arm beams and supporting said lower lift cylinder mounting attachments; and said two end housings attached to said trailing arm weldment by upper clamp bolts, said ends of said spring means secured within said end housings by rubber spring end isolators.

12. The modular suspension system, as disclosed in claim 9, wherein:

said lift arm assembly further comprises at least two longitudinal rails connected by at least two lateral rails, each longitudinal rail having a front end and a rear end, each said rear end including a fifth wheel plate mounting brackets between which is attached said fifth wheel plate by pivot pins, each said rear end also including said lift cylinder mounting attachment located in front of said fifth wheel plate mounting bracket, attaching to said upper lift cylinder mount of said at least one lift cylinder, each said front end further including a pivot bushing housing containing a lower mounting block and an upper mounting block which respectively attach together with endcap retaining bolts to an upper endcap mounting block and a lower endcap mounting block of an endcap, within which one of said composite pivot bushings are secured, said lift arm assembly further stiffened and held in desired relation by a welded top plate;

said trailing arm assembly further comprises two trailing arm beams each said trailing arm beam having a front end and a rear end, each said front end having a lower control arm droplink welded to each said trailing arm beam, said trailing arm beams joined at said front ends by a front suspension cross member and reinforced by corner braces, each said control arm droplink defining a pivot bushing socket tube containing said elastomeric trailing arm bushings, with a suspension attaching bolt attaching each elastomeric trailing arm bushing and each composite bushing through said pivot bushing socket tube to suspension attaching bolt tubes of said terminal tractor frame, and each said rear end of said trailing arm beam welded to an axle clamp mounting plate and a trailing arm weldment comprising a rear portion of each trailing arm;

an axle clamp weldment secured to an axle clamp mounting plate by lower clamp bolts, said axle clamp weldment further attached to said rear portion of said trailing arm assembly by end housing retainer bolts and rear cross member retainer bolts, wherein said axle clamp mounting plate, rear axle clamp weldment and said trailing arm weldment define a cavity within which said rear axle is secured to said trailing arm assembly and clamped in place by axle clamp bolts;

a rear cross member and fifth wheel rest weldment secured upon an upper surface of each trailing arm weldment with spring end housings securing said spring means;

a cylinder mounting attachment welded to a lower surface of each trailing arm beam supporting said lower lift cylinder mount of said at least one lift cylinder and a suspension center cross member connecting said two trailing arm beams and supporting said lower lift cylinder mounting attachment;

said two end housings attached to said trailing arm weldment by upper clamp bolts, said ends of said spring means secured within said end housings by rubber spring end isolators; and a rear loading ramp integrated within said terminal tractor frame adapted to said modular suspension system, said rear loading ramp defining a tapered approach section having a suspension mounting cross member to facilitate mounting of said spring means, a recess within said tapered approach section defining a rear cross member plate, directed to said fifth wheel plate when said lift arm assembly is in a lowered position.

13. A modular suspension system adapted to a terminal tractor having a frame, comprises:

a lift arm assembly having a rear segment and a rear segment pivotally attached to a fifth wheel plate;

a trailing arm assembly having a front segment and a rear segment attaching to a rear axle, said front segment of said trailing arm assembly pivotally connecting to said frame of said terminal tractor at two pivot bushing socket tubes housing elastomeric trailing arm pivot bushings which rotate on a common axis, said elastomeric trailing arm bushings holding an enforced longitudinal position of said trailing arm assembly while allowing limited vertical movement and side-to-side rotation of said trailing arm assembly relative to said frame, wherein said front segment of said lift am assembly is joined to said trailing arm assembly by two large diameter composite bushings rotating on said outer surfaces of said pivot bushing socket tubes of said elastomeric trailing arm pivot bushings, said elastomeric trailing arm pivot bushings isolating said trailing arm assembly and said lift arm assembly from said frame, with two tandem lift cylinders forcing said lift arm assembly from said trailing arm assembly to forcibly elevate and lower said lift arm assembly and said fifth wheel plate;

said trailing arm portion further comprising a rear portion supporting two end housings behind said rear axle securing two ends of a transverse leaf spring, said transverse leaf spring having a center, said transverse leaf spring further stabilizing side to side location of said rear axle and said lift arm assembly and providing controlled vertical and side to side rotational movement, with said transverse leaf spring adjusted to a preferred riding characteristic; and lower lift cylinder mounts of said two lift cylinders at lift cylinder mounting attachments positioned in front of said rear axle, said lift cylinders having upper lift cylinder mounts which are pivotally mounted to lift cylinder mounting attachments in said lift arm assembly in front of said fifth wheel plate, said lift cylinders, under pressure, extending and raising said rear segment of said lift arm assembly and said fifth wheel plate, transferring relative lifting forces to said lift arm assembly and trailing arm assembly, isolating said relative lifting forces from said frame of said terminal tractor by said composite bushings, said elastomeric trailing arm bushings and said transverse leaf spring at said rear segment of said trailing arm assembly.

14. The modular suspension system, as disclosed in claim 13, wherein said lift arm assembly further comprises:
said lift arm assembly further comprises at least two longitudinal rails connected by at least two lateral rails, each longitudinal rail having a front end and a rear end, each said rear end including a fifth wheel plate mounting brackets between which is attached said fifth wheel plate by pivot pins, each said rear end also including said lift cylinder mounting attachment located in front of said fifth wheel plate mounting bracket, attaching to said upper lift cylinder mount one of said two tandem lift cylinders, each said front end further including a pivot bushing housing containing a lower mounting block and an upper mounting block which respectively attach together with endcap retaining bolts to an upper endcap mounting block and a lower endcap mounting block of an endcap, within which one of said composite pivot bushings are secured, said lift arm assembly further stiffened and held in desired relation by a welded top plate.

15. The modular suspension system, as disclosed in claim 13, wherein:
said lift arm assembly further comprises at least two longitudinal rails connected by at least two lateral rails, each longitudinal rail having a front end and a rear end, each said rear end including a fifth wheel plate mounting brackets between which is attached said fifth wheel plate by pivot pins, each said rear end also including said lift cylinder mounting attachment located in front of said fifth wheel plate mounting bracket, attaching to said upper lift cylinder mount of one of said two tandem lift cylinder, each said front end further including a pivot bushing housing containing a lower mounting block and an upper mounting block which respectively attach together with endcap retaining bolts to an upper endcap mounting block and a lower endcap mounting block of an endcap, within which one of said composite pivot bushings are secured, said lift arm assembly further stiffened and held in desired relation by a welded top plate; and
said trailing arm assembly further comprises two trailing arm beams each said trailing arm beam having a front and a rear end, each said front end having a lower control arm droplink welded to each said trailing arm beam, said trailing arm beams joined at said front ends by a front suspension cross member and reinforced by corner braces, each said control arm droplink defining a pivot bushing socket tube containing said elastomeric trailing arm bushings, with a suspension attaching bolt attaching each elastomeric trailing arm bushing and each composite bushing through said pivot bushing socket tube to suspension attaching bolt tubes of said terminal tractor frame, and each said rear end of said trailing arm beam welded to an axle clamp mounting plate and a trailing arm weldment comprising a rear portion of each trailing arm;
an axle clamp weldment secured to an axle clamp mounting plate by lower clamp bolts, said axle clamp weldment further attached to said rear portion of said trailing arm assembly by end housing retainer bolts and rear cross member retainer bolts, wherein said axle clamp mounting plate, rear axle clamp weldment and said trailing arm weldment define a cavity within which said rear axle is secured to said trailing arm assembly and clamped in place by axle clamp bolts;
a rear cross member and fifth wheel rest weldment secured upon an upper surface of each trailing arm weldment with said spring end housings securing said transverse leaf spring;
a cylinder mounting attachment welded to a lower surface of each trailing arm beam supporting said lower lift cylinder mounts of said lift cylinders and a suspension center cross member connecting said two trailing arm beams and supporting said lower lift cylinder mounting attachments; and
said two end housings attached to said trailing arm weldment by upper clamp bolts, said ends of said transverse leaf spring secured within said end housings by rubber spring end isolators.

16. The modular suspension system, as disclosed in claim 13, wherein:
said lift arm assembly further comprises at least two longitudinal rails connected by at least two lateral rails, each longitudinal rail having a front end and a rear end, each said rear end including a fifth wheel plate mounting brackets between which is attached said fifth wheel plate by pivot pins, each said rear end also including said lift cylinder mounting attachment located in front of said fifth wheel plate mounting bracket, attaching to said upper lift cylinder mount of one of said two tandem lift, each said front end further including a pivot bushing housing containing a lower mounting block and an upper mounting block which respectively attach together with endcap retaining bolts to an upper endcap mounting block and a lower endcap mounting block of an endcap, within which one of said composite pivot bushings is secured, said lift arm assembly further stiffened and held in desired relation by a welded top plate;
said trailing arm assembly further comprises two trailing arm beams each said trailing arm beam having a front end and a rear end, each said front end having a lower control arm droplink welded to each said trailing arm beam, said trailing arm beams joined at said front ends by a front suspension cross member and reinforced by corner braces, each said control arm droplink defining a pivot bushing socket tube containing said elastomeric trailing arm bushings, with a suspension attaching bolt attaching each elastomeric trailing arm bushing and each composite bushing through said pivot bushing socket tube to suspension attaching bolt tubes of said terminal tractor frame, and each said rear end of said trailing arm beam welded to an axle clamp mounting plate and a trailing arm weldment comprising a rear portion of each trailing arm;
an axle clamp weldment secured to an axle clamp mounting plate by lower clamp bolts, said axle clamp weldment further attached to said rear portion of said trailing arm assembly by end housing retainer bolts and rear cross member retainer bolts, wherein said axle clamp mounting plate, rear axle clamp weldment and said trailing arm weldment define a cavity within which said rear axle is secured to said trailing arm assembly and clamped in place by axle clamp bolts;
a rear cross member and fifth wheel rest weldment secured upon an upper surface of each trailing arm weldment with said spring end housings securing said transverse leaf spring, said two end housings attached to said trailing arm weldment by upper clamp bolts, said ends of said transverse leaf spring secured within said end housings by rubber spring end isolators;

a cylinder mounting attachment welded to a lower surface of each trailing arm beam supporting said lower lift cylinder mounts of said lift cylinders and a suspension center cross member connecting said two trailing arm beams and supporting said lower lift cylinder mounting attachments; and a rear loading ramp integrated within said terminal tractor frame adapted to said modular suspension system, said rear loading ramp defining a tapered approach section having a suspension mounting cross member to facilitate mounting of said spring means, a recess within said tapered approach section defining a rear cross member plate, directed to said fifth wheel plate when said lift arm assembly is in a lowered position.

* * * * *